United States Patent
Jasinska-Walc et al.

(10) Patent No.: US 10,858,513 B2
(45) Date of Patent: Dec. 8, 2020

(54) COMPATIBILISED POLYOLEFIN AND POLYPHENYLENE OXIDE AND/OR POLYSTYRENE COMPOSITION

(71) Applicant: SABIC GLOBAL TECHNOLOGIES B.V., Bergen op Zoom (NL)

(72) Inventors: Lidia Jasinska-Walc, Eindhoven (NL); Robbert Duchateau, Eindhoven (NL); Katrien Veerle Bernaerts, Maasmechelen (BE); Piotr Lorenc, Geleen (NL); Miloud Bouyahyi, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 11 days.

(21) Appl. No.: 16/463,182

(22) PCT Filed: Nov. 23, 2017

(86) PCT No.: PCT/EP2017/080152
§ 371 (c)(1),
(2) Date: May 22, 2019

(87) PCT Pub. No.: WO2018/096014
PCT Pub. Date: May 31, 2018

(65) Prior Publication Data
US 2019/0375934 A1 Dec. 12, 2019

(30) Foreign Application Priority Data
Nov. 24, 2016 (EP) .................................. 16200406

(51) Int. Cl.
*C08L 23/08* (2006.01)
*C08L 23/12* (2006.01)
*C08L 51/00* (2006.01)
*C08L 53/02* (2006.01)
*C08L 71/12* (2006.01)
*C08L 25/06* (2006.01)

(52) U.S. Cl.
CPC .......... *C08L 71/12* (2013.01); *C08L 23/0815* (2013.01); *C08L 23/12* (2013.01); *C08L 51/006* (2013.01); *C08L 53/02* (2013.01); *C08L 25/06* (2013.01); *C08L 2203/20* (2013.01); *C08L 2205/03* (2013.01); *C08L 2205/08* (2013.01); *C08L 2207/02* (2013.01); *C08L 2207/062* (2013.01); *C08L 2207/064* (2013.01); *C08L 2207/066* (2013.01)

(58) Field of Classification Search
CPC .......... C08L 23/00; C08L 23/04; C08L 23/06; C08L 23/08; C08L 23/10; C08L 23/12; C08L 23/14; C08L 71/08; C08L 71/10; C08L 71/12; C08L 53/00; C08L 53/02; C08L 51/00; C08L 51/06
See application file for complete search history.

(56) References Cited

U.S. PATENT DOCUMENTS

| | | | | |
|---|---|---|---|---|
| 4,584,334 A | * | 4/1986 | Lee, Jr. | C08L 51/04 524/151 |
| 4,985,495 A | * | 1/1991 | Nishio | C08L 23/10 525/250 |
| 5,370,813 A | * | 12/1994 | DeNicola, Jr. | C08L 71/123 525/68 |
| 2005/0154130 A1 | | 7/2005 | Adedeji et al. | |
| 2006/0135695 A1 | | 6/2006 | Guo et al. | |
| 2016/0362551 A1 | * | 12/2016 | Lim | C08L 71/12 |

FOREIGN PATENT DOCUMENTS

| | | |
|---|---|---|
| EP | 3053955 A1 | 8/2016 |
| JP | 2002208313 A * | 7/2002 |

OTHER PUBLICATIONS

International Search Report for International Application No. PCT/EP2017/080152; International Filing Date Nov. 23, 2017, dated Jan. 23, 2018; 5 pages.
Written Opinion for International Application No. PCT/EP2017/080152; International Filing Date Nov. 23, 2017, dated Jan. 23, 2018; 9 pages.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

The present invention relates to a composition comprising polyolefin, polyphenylene oxide (PPO) and a compatibiliser, articles made therefrom and the use of a graft or block copolymer as a compatibiliser.

14 Claims, No Drawings

COMPATIBILISED POLYOLEFIN AND POLYPHENYLENE OXIDE AND/OR POLYSTYRENE COMPOSITION

CROSS REFERENCE TO RELATED APPLICATIONS

This application is a National Stage application of PCT/EP2017/080152, filed Nov. 23, 2017, which claims the benefit of European Application No. 16200406.3, filed Nov. 24, 2016, both of which are incorporated by reference in their entirety herein.

The present invention relates to a composition comprising a polyolefin, polyphenylene oxide (PPO) and a compatibiliser, articles made therefrom and the use of a graft or block copolymer as a compatibiliser.

Compositions of a polyolefin and PPO are desirable as they potentially allow tuning of the material properties by selecting the type and amounts of the individual components. However, it is well known that polyolefins and PPO are immiscible. It is further a disadvantage that polyolefins and PPO substantially do not interact so that a blend generally results in a two-phase system having a polyolefin phase and PPO phase with poor physical properties. In addition, polymer blends of incompatible polymers may be very sensitive to processing conditions, so that implementing them on a commercial scale may get even more difficult.

Accordingly, attempts have been made to increase the interaction between the phases in such blends by adding a compatibiliser. Compatibilisers are materials that have affinity with both phases and enhance the bonding strength. As a result a material with improved properties can be obtained.

In view of the ever increasing needs for better materials properties, there is a continuous need for further developing further blends with optimized morphologies and properties, while reducing the amount of compatibiliser used.

It is therefore an object of the present invention to provide for a composition comprising a polyolefin and PS and/or PPO, which allows to fine tune and/or optimize morphologies and properties, especially mechanical properties such as impact strength.

Accordingly, the present invention relates to a composition comprising a polyolefin, a polyphenylene oxide (PPO) and a compatibiliser, wherein said compatibiliser is a block or graft copolymer comprising a polyolefin part, especially a polyolefin block, and a polystyrene part, especially a polystyrene block, wherein the $M_n$ of the polyolefin part or block is between 1 and 40 kg/mol and the $M_n$ of the polystyrene part or block is between 4 and 16 kg/mol, wherein further the compatibiliser is present in an amount of between 2 to 20 wt. % of the total amount of the composition.

Accordingly, the present inventors found that a block copolymer as herein acts as a compatibiliser in a blend of a polyolefin and PS and/or PPO and further observed that the properties of the blends are improved by addition of a relatively small amount of the compatibiliser as herein defined. This may lead to improved dimensional stability and/or improved heat resistance and/or improved stiffness and/or improved impact strength of a material with a polyolefin matrix.

By application of the invention at least some of the aforementioned objects are met.

Compatibiliser

A polymer block may be a part of a block copolymer or graft polymer having a given composition and that differs from another part of that block copolymer or graft polymer by at least one property. A block may preferably for example be a segment of a linear polymer, especially a linear block copolymer, a backbone of a graft polymer and/or a graft of a graft polymer.

The compatibiliser may have a number average molecular weight ($M_n$) for example from 3,000 and 90,000 g/mol, preferably from 10,000 to 40,000 g/mol, further preferred 15000 to 30000 g/mol.

Polystyrene Block

The PS block in the compatibiliser of the composition according to the present invention may have an number average molecular weight ($M_n$) between 4 and 16 kg/mol, further preferred between 5 and 15 kg/mol, further preferred between >5 and <15 kg/mol.

Polyolefin Block

The polyolefin block in the compatibiliser of the composition according to the present invention may be for example a propylene homopolymer or a propylene copolymer containing at least 90 wt. % of propylene on the basis of the weight of the polypropylene block. Comonomers may be ethylene or C3-C8 α-olefins, preferably ethylene. Preferably the amount of comonomer is at most 7.5 wt. %, more preferably at most 2 wt. %. If the amount of comonomer is too high the material may become fully amorphous which from a viewpoint of mechanical properties may not be desirable in certain applications.

Alternatively, the polyolefin block in the compatibiliser of the composition according to the present invention may be for example an ethylene homopolymer or an ethylene copolymer containing at least 90 wt. % of ethylene on the basis of the weight of the polyethylene block. Comonomers may be ethylene or C3-C8 α-olefins, preferably for example propylene, C6 α-olefins or C8 α-olefins. By expressions like for example C3-C8 α-olefins or C6 α-olefins, respectively α-olefins with 3 to 8 carbon atoms or α-olefins with 6 carbon atoms are meant. Preferably the amount of comonomer is at most 7.5 wt. %, more preferably at most 2 wt. %.

The polyolefin block may for example be polyethylene, especially for example very low density polyethylene (VLDPE), linear low density polyethylene (LLDPE), low density polyethylene (LDPE), high density polyethylene (HDPE), or polypropylene (PP), especially polypropylene homopolymer, especially isotactic polypropylene homopolymer, and/or a polypropylene copolymer, especially for example comprising between 0.5 and 5 wt. % of ethylene and/or another alpha-olefin.

The polyolefin and/or polypropylene block in the compatibiliser may have a number average molecular weight ($M_n$) between 1 and 20 kg/mol, preferably between 1.5 and 15 kg/mol, further preferred between 2 and 12 kg/mol, further preferred between 4 and 10 kg/mol.

Type of Block Copolymer

The block copolymer according to the present invention is preferably of the type AB or BAB with A representing polyolefin and B representing PS.

The block copolymer may also be a graft copolymer of structure $AB_n$ having a polyolefin backbone with n PS branches grafted thereon, n being at least 1. For graft copolymers the backbone may be considered as the polyolefin block. The grafts may represent other polymer blocks. In the sense of the invention, a graft copolymer may thus be a type of block copolymer. The amount of grafts per 1000 main chain carbon atoms may be for example >0 and <10, preferably <5, further preferred <2 or even further preferred <1. The number of grafts may not be too high because otherwise the polyolefin backbone will not interact sufficiently with the polyolefin phase in the composition.

In an embodiment where a block copolymer contains two or more B (i.e. PS) blocks these B blocks may be the same or different in length, i.e. may have the same or different molecular weight, depending on the conditions of the process to manufacture the block copolymer.

Method of Manufacture: Block Copolymer

In an embodiment the block copolymers can be manufactured for example by a three-step method.

In a first step (A) an olefinic monomer, especially ethylene or propylene, and optionally another olefinic comonomer is/are polymerised using a catalyst system to obtain a first polyolefin block containing a main group metal on at least one chain end; the catalyst system comprising:

i) a metal catalyst or metal catalyst precursor comprising a metal from Group 3-10 of the IUPAC Periodic Table of elements; and ii) at least one type of chain transfer agent; and iii) optionally a co-catalyst;

Thus, in step (A) a polyolefin, with or without comonomer, can be prepared by means of coordinative chain transfer polymerisation (CCTP) in the presence of a catalyst, cocatalyst, at least one type of chain transfer agent and optionally an additional chain shuttling agent. Chain transfer and/or chain shuttling agents used are typically for example aluminium-, boron- and/or zinc hydrocarbyl species. This process results in polyolefin chains that are end-functionalized with a metal atom, which is susceptible to react with an oxidizing agent such as oxygen.

In a second step (B) the first polyolefin block containing a main group metal on at least one chain end obtained in step A) may be reacted with at least one type of oxidizing agent and/or subsequently at least one type of metal substituting agent to obtain a first polyolefin block containing at least one functionalised chain end. Preferably, the functionalised chain end comprises a hydroxyl group or a carboxylic acid group.

Thus, during step (B), the product obtained from step (A) may be treated for example with oxygen, as oxidizing agent, optionally followed by a protic agent, such as acidified alcohol as a metal substituting agent, to remove the metal affording a hydroxyl end-functionalized polyolefin product.

In a third step (C) at least one functionalized chain end is converted into a radical initiator functionality. For example, a hydroxyl functionality, obtained after step (B), might be converted by reaction with an acid halide bearing a further halogen atom that functions as a radical initiator functionality.

In a fourth step (D) a second polymer block is formed on the first polyolefin block, wherein as an initiator the further halogen atom may be used to obtain a block or graft copolymer by atom transfer radical polymerisation (ATRP), especially for example activator regenerated by electron transfer (ARGET) ATRP. Thus, in step (C) the product of step (C) may be used as a macro-initiator for the formation of the copolymer.

Alternatively, the fourth step (D) mentioned above can also be performed with preformed or otherwise obtained polyolefins preferably for example with a functionalized chain end, that can be used as a macro-initiator to obtain the second polymer block. In such a case, the first and/or second and/or third steps (A and/or B and/or C) maybe optional.

Polyolefin

A polyolefin in the composition according to the present invention can preferably be for example polypropylene and/or polyethylene.

Polypropylene in the composition may be for example: one or more of a propylene homopolymer, one or more of a propylene—α-olefin random copolymer, preferably a propylene ethylene or a propylene $C_4$-$C_8$ α-olefin random copolymer, one or more of a propylene—α-olefin block copolymer, one or more of a hetero-phasic polypropylene copolymer comprising a matrix phase and a dispersed phase, the matrix phase consisting of a propylene homopolymer and/or a propylene copolymer with up to 3 wt. % of ethylene and/or at least one $C_4$-$C_8$ α-olefin, the wt. % being based on the matrix phase, and the dispersed phase consisting of an ethylene—$C_3$-$C_8$ α-olefin copolymer, a mixture of two or more of the foregoing polypropylenes.

Isotactic polypropylene may thereby be preferred.

If the polypropylene is a hetero-phasic copolymer it is preferred that the matrix phase is a propylene homopolymer and/or a propylene-ethylene copolymer with up to 3 wt. % of ethylene and further that the dispersed phase is an ethylene propylene copolymer with from 20-80 wt. % of propylene and 80-20 wt. % of ethylene, the wt. % based on the dispersed phase.

The polypropylene may preferably be a propylene homopolymer or a random copolymer of propylene with ethylene or with $C_4$-$C_8$ α-olefin. The random copolymer thereby contains for example at most 5 wt. %, on the basis of the copolymer, of said ethylene or α-olefin. The random copolymer may preferably be a propylene-ethylene random copolymer.

Preferably, the melt flow rate of the polypropylene is from 0.1-100 g/10 min as measured in accordance with ISO 1133 (2.16 kg, 230° C.). More preferably, the melt flow rate is from 5.0 to 60 g/10 min.

Polyethylene in the composition according to the present invention may be a very low density polyethylene (VLDPE), linear low density polyethylene (LLDPE), low density polyethylene (LDPE), medium density polyethylene (MDPE), high density polyethylene (HDPE). The polyethylene may also be a mixture of at least two or more of the foregoing polyethylenes. For example, the polyethylene may be a mixture of LLDPE and LDPE or it may be a mixture of two different types of LDPE.

The terms VLDPE, LDPE, LLDPE, MDPE and HDPE are known in the art. Nevertheless, very low density polyethylene may mean polyethylene or ethylene copolymer with a density of for example between 850 kg/m$^3$ and 915 kg/m$^3$. Linear low density polyethylene and low density polyethylene may mean respectively an ethylene copolymer or polyethylene with a density of from 915 to 925 kg/m$^3$. Medium density polyethylene may mean polyethylene with a density of more than 925 kg/m$^3$ and less than 935 kg/m$^3$. High density polyethylene may mean polyethylene with a density of 935 kg/m$^3$ or more, especially for example between 935 kg/m$^3$ and 980 kg/m$^3$.

Preferably the melt flow rate of the may be for example polyethylene is from 0.1-100 g/10 min as measured in accordance with ISO 1133 (2.16 kg, 190° C.).

Polystyrene

Polystyrene may have an $M_n$ for example between 1000 and 100000 g/mol, preferably between 2000 and 800000 g/mol.

Polystyrene may have polydispersity index (PDI) for example between 1 and 10, preferably between 1.5 and 8.

Polystyrene may have MFR for example between 2 and 15, preferably between 5 and 10 (230° C/216 kg).

Polyphenylene Oxide

Polyphenylene oxide (PPO) may preferably be poly(2,6-dimethylphenylene oxide).

Polyphenylene oxide may have an $M_n$ for example 5000 and 75000 g/mol, preferably between 10000 and 50000 g/mol.

Polyphenylene oxide may have polydispersity index (PDI) for example between 1 and 7, preferably between 2 and 5.

Polyphenylene oxide may have intrinsic viscosity for example between 0.1 and 0.9 dL/g, preferably between 0.2 and 0.6 dL/g.

Composition

The composition according to the invention may comprise a polyolefin, a polyphenylene oxide (PPO) and a compatibiliser, wherein said compatibiliser is a block or graft copolymer comprising a polyolefin part, especially a polyolefin block, and a polystyrene part, especially a polystyrene block, wherein the $M_n$ of the polyolefin part or block is between 1 and 40 kg/mol and the $M_n$ of the polystyrene part or block is between 1 and 100 kg/mol, wherein further the compatibiliser is present in an amount of between 2 to 20 wt. % of the total amount of the composition.

The composition according to the invention may further optionally comprise polystyrene (PS).

The amount of polyolefin in the composition according to the invention may vary from 5 to 95 wt. % on the basis of the total amount of polyolefin, PPO and optional PS. Preferably the amount of polyolefin may be for example from 10 to 90 wt. %, preferably from 20 to 80 wt. % or from 30 to 70 wt. % or from >50 to 95 wt. % or from 60 to 90 wt. % or from 70 to 87 wt. % or from 75 to 85 wt. % on the basis of the total amount of polyolefin, PPO and opyional PS. Accordingly, the amount of PPO and optional PS may vary from 95 to 5 wt. % on the basis of the total amount of polyolefin, PPO and optional PS. Preferably the amount of PPO may be from 90 to 10 wt. %, from 80 to 20 wt. % or from 70-30 wt. % or from <50 to 5 wt. % or from 40 to 10 wt. % or from 30 to 13 wt. % or from 25 to 15 wt. % on the basis of the total amount of polyolefin, PPO and optional PS.

The amount of optional PS may be <50 wt. %, preferably <30 wt. %, further preferred <15 wt. %, further preferred <5 wt. % on the basis of the total amount of polyolefin, PPO and optional PS. The composition according to the invention may also not comprise any PS.

The component of the composition present in the highest amount based on the total amount of the composition or forming the continuous phase may be considered as forming the matrix of the composition. Components of the composition present in lower amounts with respect to the matrix or belonging to a discontinuous phase may be considered as dispersed in the matrix and/or dispersed phase in the matrix.

The ratio of the viscosities of the polyolefin and PPO may preferably be selected, for example so as to improve compatibilisation, for example between 1 and 10, preferably between 1.2 to 7, preferably from 1.5 to 5.5, even more preferred from 1.6 to 4.

In an embodiment, the compatibiliser according to the present invention may be premixed with dispersed phase, so as to possibly improve compatibilisation.

In an embodiment, the composition according to the invention may be obtained by premixing the compatibiliser with the matrix and/or the dispersed phase(s) of the composition before adding the other component of the composition.

A method of manufacture of the composition may comprise for example the steps of Preparing a master batch by melt mixing the polymer that will form the matrix in the composition and the compatibiliser, Melt mixing the master batch so obtained with the polymer that will form the dispersed phase in the composition. or Preparing a master batch by melt mixing the polymer that will form the dispersed phase in the composition and the compatibiliser, Melt mixing the master batch so obtained with the polymer that will form the matrix phase in the composition.

Preferably, a major part, even more preferred substantially all, of the compatibiliser may be contained in a master batch and that a minor part, preferably substantially none, of compatibiliser is added during the final melt mixing step that leads to the formation of the composition.

During the step of preparing a master batch for example from 80-100% of the total amount of compatibiliser may be added to the master batch and 0-20% of the total amount of compatibiliser maybe added during the step of preparing the composition from a master batch and the polymer that will form the matrix or the dispersed phase in the composition.

This method can contribute to the fact that the compatibiliser may be even more effective possibly resulting in even further optimized properties of the composition.

The amount of compatibiliser may be for example from 2-20 wt. %, preferably from 3-17 wt. %, especially from 4-13 wt. %, further preferred from 5-12.5 wt. % on the basis of the total amount of the composition.

The composition may be obtained be mixing the component of the composition for example for at least 1 minute, at least 2 minutes, at least 3 minutes, at least 4 minutes, at least 5 minutes, at least 6 minutes, at least 8 minutes, at least 10 minutes, at least 15 minutes, at least 20 minutes.

In an embodiment the invention relates to a composition comprising 5-95 wt. % of polyolefin based on the total amount of polyolefin, PPO and optional PS, 95-5 wt. % PPO and optional PS based on the total amount of polyolefin, PPO and optional PS, 2-20 wt. % compatibiliser based on the total amount of the composition, wherein the polyolefin has a melt flow rate of from 1 to 20 (ISO 1133, 2.16 kg, 230° C.) and the compatibiliser has a number average molecular weight (Mn) of from 10000 to 100000 g/mol, preferably from 15000 to 30000 g/mol.

The composition may further contain additives common in the art such as for example dyes, pigments, antioxidants, ultra-violet stabilisers, infrared absorbers, flame retardants, mould release agents and the like. Such additives may be comprised for example in an amount of up to about 5 wt. % on the basis of the weight of the composition.

The composition may also further comprise reinforcing agents like for example talc, glass fibres, glass flakes, glass platelets, organic fibres, carbon fibres, cellulosic fibres and the like. Talc and or glass fibres being preferred. The amount of reinforcing agent may for example be from 1-20 wt. % on the basis of the weight of the composition.

A skilled person will understand that the composition according to the invention may preferably be a thermoplastic composition.

Articles

The present invention further relates to articles comprising the composition as disclosed herein. The present invention further relates to articles manufactured from the composition as disclosed herein. Generally, the composition is converted into an article using a moulding technique such as injection moulding, extrusion moulding, blow moulding and compression moulding. Accordingly, the present invention also relates to an article obtained by moulding the composition according to the present invention. It is also possible to manufacture profiles or tubes by means of profile or tube extrusion.

In the article obtained by moulding or extrusion at least part of the PS block(s) of the compatibiliser may be for example present in and/or entangled with in the PPO phase and/or at least part of the polyolefin block(s) of the compatibiliser is present in and/or entangled the polyolefin phase.

Articles may be automotive interior articles, automotive exterior articles, household appliances, pipes, films, sheets, containers, water containers, infuse bags.

Use

In another aspect the present invention relates to the use of a block or graft copolymer comprising a polyolefin part, especially a polyolefin block, and a polystyrene part, especially a polystyrene block, wherein the $M_n$ of the polyolefin part or block is between 1 and 40 kg/mol and the $M_n$ of the polystyrene part or block is between 1 and 100 kg/mol,as a compatibiliser in a composition, which is a blend of polyolefin and PPO or a blend of polyolefin and PPO and optionally PS. The details and preferred embodiments as set out here before for the composition likewise apply to the use according to the invention.

The invention will now be further explained on the basis of the following non-limiting examples.

EXAMPLES

Materials

Chloroform-d [CDCl$_3$] (VWR, 99.8% D), ethyl α-bromoisobutyrate [EtBriBu] (Sigma Aldrich, 98%), ethanol [EtOH] (VWR, 96%), toluene (VWR, 100%), 4-dimethylaminopyridine [DMAP] (Acros Organics, 99%), bromosiobutyrylbromide [BriBuBr] (Acros Organics, 98%), copper(II)bromide [Cu(II)Br$_2$] (Sigma Aldrich, 99%), tetrahydrofuran [THF] (Biosolve, 99.8+%), methanol [MeOH] (Acros Organics, 99+%), dimethylformamide [DMF] (Sigma Aldrich, 99.8+%), tin(II)ethylhexanoate [Sn (EH)$_2$] (Sigma Aldrich, 95%);, tris(2-pyridylmethyl)amine [TPMA] (Sigma Aldrich, 98%), anisole (Acros Organics, 99%), dimethyl acetamide [DMA] (Acros Organics, 99%), triethylamine [Et$_3$N], tetrachloroethane [TCE] (Acros Organics, 99.5%), sodium hypophosphite monohydrate [So-Hyp, NaH2PO$_2$xH$_2$0], iPP hydroxyl-functionalized [iPP-OH] (SABIC, $M_n$=2500 g/mol, $M_w$=7700 g/mol); PP (PP525P), PP (PP520P), PS (PS153F) (PPO Noryl 640), styrene (Sigma Aldrich, 98%) were used as received unless stated otherwise. For the synthesis of OH-functionalized PP dry, oxygen-free PMH was employed as solvent for all polymerizations, methylaluminoxane (MAO, 30 wt. % solution in toluene) was purchased from Chemtura, diethyl zinc (DEZ, 1.0 M solution in hexanes), triisobutyl aluminum (TiBA, 1.0 M solution in hexanes) were purchased from Sigma Aldrich. rac-Me$_2$Si(2-Me-4-Ph-Ind)$_2$ZrCl$_2$ was purchased from MCAT GmbH, Konstanz, Germany.

Measurement Methods $^1$H NMR analysis of the polystyrene homopolymers was carried out at 25° C. in deuterated chloroform (CDCl$_3$) while the analysis of iPP and copolymers was performed at 80° C. in deuterated tetrachloroethene (TCE-d$_2$). NMR spectra were recorded in 5 mm tubes using NMR Bruker Biospin AG spectrometer operating at frequencies of 300 MHz. Chemical shifts are reported in ppm versus tetramethylsilane and determined in reference to the signals of residual solvent.

GPC[1] (Gel Permeation Chromatography) of the polystyrene homopolymers was performed at 40° C. on a Waters GPC System equipped with three in series connected Waters Styrangel HR 5, 4, 1 columns with size 7.8×300 mm, Waters 2414 RI detector and Waters 1515 Isocratic HPLC pump. THF was used as eluent at flow rate 1 mL/min.

The molecular weights were calculated with respect to polystyrene standards (Sigma Sigma Aldrich). Waters 2707 autosampler was used for sample injections.

GPC[2] measurements of the polyolefins and polyolefin-based copolymers were performed at 150° C. on a Polymer Char GPC-IR® built around an Agilent GC oven model 7890, equipped with an autosampler and the Integrated Detector IR4. 1,2-dichlorobenzene (oDCB) was used as an eluent at a flow rate of 1 mL/min. The SEC-data were processed using Calculations Software GPC One®. The molecular weights were calculated with respect to polystyrene standards.

Tensile tests were performed with a Zwick BZ100/SN5A tensile tester equipped with a 50 kN load cell. The tests were performed on injection molded samples having the dimension of 75 mm×4 mm×2 mm. A grip-to-grip separation of 35 mm was used. Constant cross-head speed was 50 mm/min.

Izod impact strength was measured using a Zwick/Roell HIT5.5P tester according to ISO 180-2001. The dimensions of the injection molded sample bars without notch were 80 mm×10 mm×4 mm. For the samples the average value reported was derived for at least five specimens. The testing was carried out at room temperature.

Glass transition ($T_g$) and crystallization ($T_c$) temperatures as well as enthalpies of the transitions were measured by differential scanning calorimetry (DSC) using a DSC Q100 from TA Instruments. The measurements were carried out at a heating and cooling rate of 10° C.•min$^{-1}$ from −50° C. to 240° C. The transitions were deduced from the second heating and cooling curves.

SEM analysis The morphology of the blends was examined with a scanning electron microscope SEM of freeze fractured samples. The analysis were performed using scanning electron microscope Phenom™ with a magnification range: 80-100,000×, digital zoom: 12×(ProX/Pro). The samples were sputter coated using sputter coater with Au. For SEM analysis injection molded parts were used.

Typical Procedure for the Synthesis of Hydroxyl End-Capped polypropylene (PP-OH):

Polymerisation reactions were carried out in stainless steel Büchi reactors (300 mL). Prior to the polymerisation, the reactor was dried in vacuo at 40° C. and flushed with dinitrogen. PMH (90 mL) and MAO (30 wt. % solution in toluene) were added and stirred at 50 rpm for 20-30 min. TiBA (1.0 M solution in hexanes) and DEZ (1.0 M solution in hexanes) were added. The solution was saturated with propylene and stirred for 10 min. In a glove box, the catalyst was dissolved in toluene (c.a. 3 mL) and transferred into the reactor. The reactor was then pressurized to the desired pressure with propylene and the pressure was maintained constant for a predefined time. At the end of polymerisation, the propylene feed was stopped and after venting off the residual propylene, synthetic air was injected through a gas injection tube and the suspension was maintained under constant synthetic air pressure (6 bars) at 60° C. for 2 h with rigorous stirring (600 rpm) before quenching with 300 mL of acidified methanol (2.5 v% of concentrated HCl 37 wt %).

The resulting white powder was then filtered, washed with methanol and dried at 60° C. under reduced pressure in a vacuum oven at 60° C. for 24 h. The thus obtained iPP-OH was analysed.

The block copolymers were characterized in terms of their molar and weight content of iPP in the product and PS block chain length. These values were determined based on $^1$H NMR and GPC analysis.

TABLE 1

Overview of the synthesized PP-block-PS copolymers.

| Entry | $M_n$ Br-iPP [kg/mol] | Reducing agent | M/I/L/C/R/S % vol | T [° C.] | PS wt. % | $M_n$ PS [kg/mol] | conv. (%) | PDI |
|---|---|---|---|---|---|---|---|---|
| 1 | 2.5 | Sn(EH)$_2$ | 79/1/0.1/0.01/0.1/30 | 110 | 66 | 5.7 | 78 | 2.2 |
| 2 | 7.7 | Sn(EH)$_2$ | 100/1/0.1/0.01/0.1/80 | 110 | 40 | 5.2 | 90 | 2.7 |
| 3 | 7.7 | Sn(EH)$_2$ | 120/1/0.1/0.01/0.1/65 | 110 | 57 | 10.0 | 88 | 3.1 |
| 4 | 7.7 | Sn(EH)$_2$ | 650/1/0.1/0.01/0.1/— | 110 | 73 | 20.8 | 27 | 2.6 |
| 5 | 7.7 | Sn(EH)$_2$ | 1000/1/0.1/0.01/0.1/— | 110 | 89 | 58.6 | 50 | 3.2 |
| 6 | 7.7 | Sn(EH)$_2$ | 1500/1/0.4/0.04/0.4/— | 110 | 91 | 78.1 | 70 | 7.4 |
| 7 | 7.7 | SoHyp | 800/1/0.1/0.01/1.6/— | 110 | 83 | 38.4 | 50 | 3.5 |
| 8 | 7.7 | SoHyp | 1500/1/0.4/0.04/1.6/— | 110 | 89 | 65.2 | 35 | 3.9 |
| 9 | 7.7 | SoHyp | 800/1/0.1/0.01/1.6/— | 130 | 85 | 42.5 | 79 | 5.5 |

M-monomer, I-initiator, L-ligand, C-catalyst, R-reducing agent, S-solvent
The reactions carried out for 24 h Typical Procedure for the Synthesis of Br-Functionalized iPP In the synthesis of Br-functionalized iPP, iPP-OH and α-bromoisobutyryl bromide were used. The reaction was carried out in dry 3-neck, round bottom flask under nitrogen atmosphere at 100° C. The molar ratio of iPP-OH/α-bromoisobutyryl bromide/tri-ethylamine(Et$_3$N)/4-dimethylaminopyridine(DMAP) was 1/10/10/0.005. The concentration of the solution was 10 wt. %.

Procedure: magnetic stirrer, DMAP (catalyst) and iPP-OH were added to the flask. Then dry toluene (solvent) and dry triethylamine (bromide trap) was added through a septum. The flask was submerged in an oil bath and heated to 110° C. and at the end α-bromoisobutyryl bromide was added dropwise. The reaction was carried out for 5 hours. The product was precipitated in methanol, filtered and dried under reduced pressure. The chemical structures of OH-functionalized iPP and Br-functionalized iPP were confirmed by $^1$H NMR spectroscopy.

Typical Procedure for the Synthesis of PP-block-PS Copolymers

In the synthesis of PP-block-PS, OH-functionalized iPP and styrene, were used. The reaction was carried out in a Schlenk flask under nitrogen atmosphere at 110° C. An example of the molar ratio of styrene/iPP-Br/ligand/Cu(Br)$_2$ was 600/1/0.1/0.01. The concentration of the solution was 30 wt. %. As the reducing agent dry tin(II) 2-ethylhexanoate, Sn(EH)$_2$ or sodium hypophosphite monohydrate (NaH$_2$PO$_2$xH$_2$O) was used.

Procedure: a Schlenk flask was charged with reducing agent, iPP-Br, ligand (tris(2-pyridylmethyl)amine (TPMA)), styrene and anisole. Subsequently, four freeze-pump thaw cycles were applied to remove the oxygen. Then copper (II) bromide (Cu(Br)$_2$) was added to a frozen reaction mixture under nitrogen atmosphere. The flask was closed and vacuum was applied. Subsequently, nitrogen atmosphere was restored and the frozen mixture was inserted in oil bath at 110° C., and stirred for 24 hours. The synthesized polymer was purified by dissolution in toluene, precipitation in ethanol and dried under reduced pressure at 50° C. for 12 hours. The chemical structure of the synthesized copolymer was confirmed by $^1$H NMR spectroscopy. The molecular weight and molecular weight distribution were determined by high temperature GPC.

Typical Procedure for the Preparation of Polypropylene/PPO Compatibilised by PP-block-PS.

A. Preparation of uncompatibilised PP/PPO blends: PPO and polypropylene were fed into the extruder chamber. The polymer blend was processed for 5 minutes at 290° C. under N$_2$ atmosphere in the micro compounder. The micro compounder was equipped with co-rotating screws, a barrel with three 3 temperature zones and a nitrogen purge at 290° C. (three temperature zones set at 290° C.) with a screw rotation rate of 100 rpm. Afterwards the mixture was evacuated directly to a mini-injection moulding machine to prepare samples for morphology analysis (injection temperature: 290° C., mold temperature: 50° C.).

B. Preparation of PP/PPO Blends Compatibilised by PP-block-PS Copolymer: poly(phenylene oxide) and PP-block-PS copolymer were fed into the extruder chamber. The mixture was processed for 3 minutes at 290° C. under N$_2$ atmosphere in the micro compounder. The micro compounder was equipped with co-rotating screws, a barrel with three 3 temperature zones (all three temperature zones set at 290° C.) and a nitrogen purge at 290° C. with a screw rotation rate of 100 rpm. Afterwards, the mixture was evacuated, cooled and granulated. Subsequently, the product consisting of PPO and PP-block-PS copolymer, was mixed with polypropylene. The polymer blend was processed for 5 minutes at 290° C. Afterwards the mixture was evacuated directly to a mini-injection moulding machine to prepare samples for morphology analysis (injection temperature: 290° C., mold temperature: 50° C.).

For each blend of the blends, indicated in Table 3, 10 gr samples were prepared with the indicated PP/PPO ratio and the indicated amount (0.5 g) of each compatibiliser (comp., C1, C2 or C3) was added on top to each sample to get 10.5 g of each compatibilised blend.

For each blend of the blends, indicated in Table 4, 10 gr samples were prepared with the indicated PP/PPO ratio and the indicated amount (1 g) of compatibiliser (comp.) C2 was added on top to each sample to get 11 g of each compatibilised blend.

For each blend of the blends, indicated in Table 5, 10 gr samples were prepared with the indicated PP/PPO ratio and the amount of compatibiliser (comp.) C2 indicated in each case (0.50 g, 0.75 g, 1.00 g or 1.25 g) was added on top to each sample to get each compatibilised blend.

Analysis of samples of the blends listed in Table 3, compatibilised using PP-block-PS copolymers listed in Table 2 (C1, C2 and C3 corresponding to entries 2, 3 and 4 in Table 1) as well as of the blends listed in Tables 4 and 5, show improved compatibilisation compared to corresponding non-compatibilised blends, especially for example smaller and/or better dispersed domain of the dispersed phase and/or optionally an increased adhesion between the two different polymer phases.

TABLE 2

Chemical composition of the PP-block-PS copolymers used for the preparation of PP/PPO blends.

| Entry | $M_n$ iPP [kg/mol] | PS wt. % | $M_n$ PS [kg/mol] |
|---|---|---|---|
| C1 | 7.7 | 40 | 5.2 |
| C2 | 7.7 | 57 | 10.0 |
| C3 | 7.7 | 73 | 20.8 |

TABLE 3

Static mechanical properties of PP/PPO blends compatibilised by 5 wt. % PP-block-PS copolymers.

| PPO content [wt. %] | Impact strength [kJ/m2] | | | | Elongation at break [%] | | | | Young Modulus [MPa] | | | |
|---|---|---|---|---|---|---|---|---|---|---|---|---|
| | C1 | C2 | C3 | B | C1 | C2 | C3 | B | C1 | C2 | C3 | B |
| 20 | 25.01 | 30.29 | 22.14 | 14.83 | 5.90 | 8.74 | 7.10 | 5.50 | 1590 | 1669 | 1650 | 1340 |
| 50 | 20.63 | 14.22 | 13.57 | 11.85 | 3.80 | 3.60 | 3.10 | 3.30 | 1590 | 1800 | 1810 | 1500 |
| 80 | 14.21 | 11.93 | 11.90 | 9.88 | 2.80 | 2.29 | 2.53 | 2.70 | 1590 | 2100 | 2050 | 1750 |

C1, C2, C3-for the type of the compatibiliser see Table 2, B-uncompatibilised PP/PPO blend

TABLE 4

Static mechanical properties of PP/PPO blends wit 10 wt. % of the compatibiliser $PP_{7700}$-block-$PS_{10000}$ (C2).

| PPO content [wt. %] | Impact strength [kJ/m$^2$] | | Elongation at break [%] | | Young Modulus [MPa] | |
|---|---|---|---|---|---|---|
| | Blank | compatibilised | Blank | compatibilised | Blank | compatibilised |
| 0 | 9.59 | — | 400 | — | 1300 | — |
| 20 | 14.83 | 45.68 | 5.50 | 13.50 | 1340 | 1445 |
| 30 | 14.51 | 39.96 | 7.20 | 9.70 | 1450 | 1600 |
| 50 | 11.85 | 19.91 | 3.30 | 4.10 | 1500 | 1870 |
| 70 | 14.14 | 27.86 | 4.30 | 8.10 | 1530 | 1610 |
| 80 | 9.88 | 16.41 | 2.70 | 2.80 | 1750 | 2070 |
| 100 | 58.88 | — | n. m. | — | 20140 | — | n.m.: below the measurable threshold

TABLE 5

Static mechanical properties of 80/20 PP/PPO blends with diffrent content of compatibiliser $PP_{7700}$-block-$PS_{10000}$ (C2).

| Compatibiliser content [wt. %] | Impact strength [kJ/m$^2$] | Elongation at break [%] | Young Modulus [MPa] |
|---|---|---|---|
| 5 | 30.29 | 8.74 | 1669 |
| 7.5 | 68.72 | 11.67 | 1590 |
| 10 | 45.68 | 13.50 | 1445 |
| 12.5 | 23.88 | 11.67 | 1550 |

Tensile tests were performed to determine the maximum stress and elongation at break with a Zwick type Z020 tensile tester equipped with a 20 kN load cell. The tests were performed on injection molded samples having the dimensions of 75 mm×4 mm×2 mm. A grip-to-grip separation of 50 mm was used. The samples were pre-stressed to 3 N, then loaded with a constant cross-head speed 50 mm/min. The analysis was performed to determine the $\sigma_{max}$ and $\varepsilon_{at\ break}$.

Izod impact strength was measured using a Zwick/Roell HIT5.5P tester according to ISO 180-2001. The dimensions of the injection molded sample bars without notch were 60 mm×10 mm×4 mm. For each sample the average value reported was derived for at least five specimens. The testing was carried out at room temperature (25° C.).

The morphology of the blends was examined with a scanning electron microscope SEM of freeze fractured samples of injection molded parts.

Based on the analysis, one can see again that the compatibilisers according to the invention improve adhesion between the two different compatibilised phases. This leads to better material properties for the compatibilised blends.

One can see from the Table 3 above that the Young Modulus may increase with an increasing Mn of the polystyrene part when going from 5.2 to 10 kg/mol and may then stay similar or slightly decrease again for an Mn of the polystyrene part of 20.8 kg/mol.

The examples thus show that the Young Modulus is especially improved when the Mn of the polystyrene part is between 4 and 16 kg/mol, especially between 5 and 15 kg/mol, particularly when the compatibilizer in an amount between 2 to 20 wt. %, especially 3 to 17 wt. %.

TABLE 6

Materials used for the blends preparation

| Materials | $M_n$ [kg · mol$^{-1}$] | $M_w$ [kg · mol$^{-1}$] | PDI | MFR [g/10 min] | Density [g/cm$^3$] |
|---|---|---|---|---|---|
| SABIC ® PP 525P | 56.2 | 415.9 | 7.4 | 3.10 (230° C./2.16 kg) | 0.905 |
| SABIC ® PP 520P | 21.0 | 168.0 | 8.0 | 10.5 (230° C./2.16 kg) | 0.905 |
| PPO Noryl 640 | 19.9 | 56.2 | 2.8 | intristic viscosity = 0.4 dL/g (at 25° C. in chloroform) | 0.476 |

The above listed SABIC materials (Table 6) were used for the preparation of the blends listed in Table 3, 4, 5. The materials are commercially available from SABIC.

The invention claimed is:

1. A composition comprising
   a polyolefin,
   a polyphenylene oxide (PPO) and
   optionally polystyrene (PS) and
   a compatibiliser,
   wherein said compatibiliser is a block or graft copolymer comprising a polyolefin part and a polystyrene part, wherein the $M_n$ of the polyolefin part is between 1 and 40 kg/mol and the $M_n$ of the polystyrene part is between 4 and 16 kg/mol,
   wherein further the compatibiliser is present in an amount of between 2 to 20 wt. % of the total amount of the composition,
   wherein the polyolefin part of the compatibiliser is a propylene homopolymer block or a propylene copolymer block containing at least 90 wt. % of polypropylene, on the basis of the weight of the propylene copolymer block, and wherein the propylene copolymer block is derived from propylene and a comonomer selected from ethylene, a $C_{4-8}$ alpha-olefin, or a combination thereof,
   wherein the amount of the polyolefin is from 50 to 95 wt. % and the amount of the polyphenylene oxide is from 50 to 5 wt. %, each on the basis of the total amount of the polyolefin, the polyphenylene oxide and the optional polystyrene.

2. The composition of claim 1, wherein the amount of the compatibiliser is from 3-17 wt. %, on the basis of the total amount of the composition.

3. The composition of claim 1, wherein the polyolefin is:
   one or more of a propylene homopolymer,
   one or more of a propylene-α-olefin random copolymer,
   one or more of a propylene-α-olefin block copolymer,
   one or more of a hetero-phasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ α-olefin, the wt. % being based on the matrix phase, and the disperse phase consisting of an ethylene —$C_3$-$C_8$ α-olefin copolymer, and/or
   a mixture of any of the foregoing polypropylenes.

4. The composition of claim 1, wherein the polyolefin is a very low density polyethylene, linear low density polyethylene, low density polyethylene, high density polyethylene or a mixture of any of the foregoing polyethylenes.

5. The composition of claim 1, wherein the compatibiliser has a number average molecular weight ($M_n$) from 10,000 to 40,000 g/mol.

6. The composition of claim 1, wherein the polyolefin part of the compatibiliser has a number average molecular weight ($M_n$) between 1 and 20 kg/mol.

7. The composition of claim 1, wherein the polystyrene part of the compatibiliser has a number average molecular weight ($M_n$) between 5 and 15 kg/mol.

8. An article comprising the composition of claim 1.

9. The article of claim 8, said article being selected from the group consisting of automotive parts, electronic devices, parts for electric plugs or contact, parts for batteries or battery cases, and parts for household appliances.

10. The composition of claim 1, wherein said compatibiliser comprises a block or graft copolymer comprising a polyolefin block, and a polystyrene block, wherein the $M_n$ of the polyolefin block is between 1 and 20 kg/mol and the $M_n$ of the polystyrene block is between >5 and <15 kg/mol.

11. The composition of claim 1, wherein the compatibiliseris a block copolymer of type AB with A representing polyolefin and B representing polystyrene.

12. The composition of claim 1, wherein the compatibiliseris is a block copolymer of type BAB with A representing polyolefin and B representing polystyrene.

13. The composition of claim 1, wherein the amount of the polyolefin is from 60 to 90 wt. % and the amount of the polyphenylene oxide is from 10 to 40 wt. %, each on the basis of the total amount of the polyolefin, the polyphenylene oxide and the optional polystyrene.

14. The composition of claim 1, wherein the amount of the polyolefin is from 75 to 85 wt. % and the amount of the polyphenylene oxide is from 15 to 25 wt. %, each on the basis of the total amount of the polyolefin, the polyphenylene oxide and the optional polystyrene.

* * * * *